United States Patent Office 3,558,746
Patented Jan. 26, 1971

3,558,746
HOT-MELT ADHESIVES OF STYRENE AND AN ACRYLIC ESTER GRAFTED UNTO A POLYSTYRENE BY BULK POLYMERIZATION
Wolfgang Sliwka, Weinheim, Bergstrasse, and Guenther Immel, Ludwigshafen (Rhine), Germany, assignors to Badische Anilin- & Soda-Fabrik Aktiengesellschaft, Ludwigshafen (Rhine), Germany
No Drawing. Filed Feb. 17, 1967, Ser. No. 616,787
Claims priority, application Germany, Feb. 23, 1966,
P 15 69 909.9
Int. Cl. C08f 15/40, 19/00
U.S. Cl. 260—885    9 Claims

ABSTRACT OF THE DISCLOSURE

Hot-melt adhesives based on graft polymers in which a mixture consisting of styrene for the most part and esters of acrylic or methacrylic acid is polymerized onto a backbone polymer consisting of polystyrene or a copolymer of styrene and for the most part acrylic or methacrylic esters, the said esters being derived from primary and/or secondary alkanols having 3 to 12 carbon atoms, are very stable even in th molten state, are particularly tough, and have an especially low viscosity in the molten state.

---

This invention relates to hot-melt adhesives based on styrene copolymers.

The use of hot-melt adhesives makes it possible to achieve high production speeds because they provide a bond within a few seconds.

It is already known to use various polymers as hot-melt adhesives, but they are unsatisfactory in several respects. Polyvinyl acetates, within a molecular weight range of about 50,000 to 500,000, possess the good mechanical properties required of an adhesive, but at temperatures of 200° C. the products give only viscoelastic, stringy melts that are difficult to process. Heating to a higher temperature is not advantageous, since polyvinyl acetate undergoes cross-linking on exposure to the air and begins to decompose and discolor. It is known to produce polyvinyl acetate mixtures that are fluid at 120° to 150° C. by adding solvents, plasticizers and other substances, such as rosin and tetrachloronaphthalene (German Pat. 837,-774) or octadecanediols (U.S. Pat. 3,004,948). However, the use of these mixtures necessitates the subsequent removal of the solvent, or the disadvantages associated with a possible migration of the plasticizer must be put with. Polyvinyl acetates having a low molecular weight are not good hot-melt adhesives on account of their inadequate cohesion. Low molecular weight vinyl acetate-ethylene copolymers can be processed in the molten state, but their adhesion to wood for example is poor so that they are not suitable for bonding such a material. Although high molecular weight ethylene-vinyl acetate copolymers are suitable as hot-melt adhesives when mixed with paraffin waxes or resins, the mixtures have a disadvantage in that the paraffin wax components readily exude.

German Pat. 864,569 proposes the use of styrene polymers as hot-melt adhesives in shoe manufacture. Melts which can be easily processed are obtained by the admixture of low-melting and especially oily polymers in amounts of 400 to 600%, but, here again, these mixtures have the disadvantages described above.

The object of this invention is to provide hot-melt adhesives which possess a particularly low viscosity in the molten state. A further object of the invention is to provide hot-melt adhesives which are highly stable in the molten state. Further objects of the invention will become apparent to the skilled worker in the following description.

It has now been found that solid materials can be advantageously bonded together by the application of molten thermoplastic as hot-melt adhesives and allowing them to set in contact with the materials to be bonded in the usual manner, by using as hot-melt adhesives graft copolymers derived from 20 to 80% by weight of styrene, 20 to 80% by weight of acrylic and/or methacrylic esters of primary and/or secondary monohydric alcohols containing 3 to 12 carbon atoms, and 0 to 10% by weight of other ethylenically unsaturated monomers, which are prepared by the polymerization of 50 to 98 parts by weight of a monomer mixture A comprising 10 to 70% by weight of styrene, 30 to 90% by weight of acrylic and/or methacrylic esters of the said type, and 0 to 10% by weight of other ethylenically unsaturated monomers in bulk in the presence of 2 to 50% by weight of a backbone polymer B comprising 50 to 100% by weight of styrene, 0 to 50% by weight of acrylic and/or methacrylic esters of the said type, and 0 to 10% by weight of other ethylenically unsaturated monomers.

The graft copolymers used according to this invention are prepared by the polymerization of a monomer mixture A in the presence of a preformed backbone polymer B in bulk, i.e. in the absence of large amounts of solvent or diluents. The resulting graft copolymers should always have the specified composition, i.e. they should comprise 20 to 80%, particularly 30 to 60%, by weight of styrene, 20 to 80%, particularly 40 to 70%, by weight of acrylic and/or methacrylic esters, and 0 to 10%, particularly 0.1 to 5%, by weight of other ethylenically unsaturated monomers. Suitable acrylic and/or methacrylic esters are those of primary and/or secondary monohydric alcohols, particularly those of primary and/or secondary alkanols, having 3 to 12, particularly 3 to 8, carbon atoms. Examples of suitable esters are propyl acrylate, isobutyl acrylate, n-butyl acrylate, 2-ethylhexyl acrylate and 2-ethylhexyl methacrylate. n-Butyl acrylate is preferred. It is possible to employ mixtures of different esters in the preparation of the backbone polymer and in the preparation of the graft copolymer. In the preparation of the graft copolymer, the composition of the monomer mixture may be similar to or different from that of the backbone polymer as regards the monomer units. It has been found advantageous to arrange for the acrylic and/or methacrylic ester content of the monomer mixture to be higher than the content of acrylic and/or methacrylic esters incorporated in the backbone polymer. There should always be about 50 to 98, particularly 50 to 75, parts by weight of a monomer mixture comprising 10 to 70%, particularly 30 to 60%, by weight of styrene, 30 to 90%, particularly 40 to 70%, by weight of acrylic and/or methacrylic esters of the said type and 0 to 10%, particularly 0.1 to 5%, by weight of other ethylenically unsaturated monomers polymerized in the presence of 2 to 50, particularly 25 to 50, parts by weight of the backbone polymer.

Other ethylenically unsaturated monomers which are particularly suitable are polar, hydrophilic monomers which as components of the copolymers are stable at the processing temperatures of the hot-melt adhesives. Examples of particularly suitable polar and hydrophilic ethylenically unsaturated monomers are the ethylenically unsaturated monocarboxylic and dicarboxylic acids with 3 to 5 carbon atoms, such as acrylic acid, methacrylic acid, crotonic acid, maleic acid and itaconic acid, as well as the amides of these acids, such as acrylamide and methacrylamide, and the N-methylolamides and their alkyl ethers derived from these acids, such as N-methylolacrylamide, N - methylolmethacrylamide and their alkyl ethers containing 1 to 4 carbon atoms in the alkyl radical, e.g. the methyl and tertiary butyl ethers of N-methylolmethacrylamide, ethylenically unsaturated sulfonic acids, such as vinyl sulfonic acid, maleic anhydride or itaconic anhydride as well as monoesters of acrylic or methacrylic acid with linear or branched alkanediols containing 2 to 6 carbon atoms, e.g., glycol monoacrylate, butanediol-1,4 monoacrylate and hexanediol-1,6 monoacrylate. The use of components of these monomers in the copolymers often leads to an increase in the adhesion of the hot-melt adhesives to certain materials, an improvement in their compatibility with certain additives or a subsequent cross-linking of the graft copolymers with added polyfunctional compounds, e.g. diisocyanates, such as toluylene diisocyanate, hexamethylene diisocyanate and naphthalene diisocyanates, or with alkanediols, such as ethylene glycol, butanediol-1,6 or with oxides of polyvalent metals, e.g. calcium oxide and zinc oxide.

The backbone copolymer derived from 50 to 100%, particularly 75 to 100%, by weight of styrene, 0 to 50%, particularly 0 to 25% by weight of acrylic and/or methacrylic esters of the type mentioned above, and 0 to 10%, particularly 0.1 to 5%, by weight of other ethylenically unsaturated monomers, can be prepared in a conventional manner, those copolymers being preferred as backbone polymers which have been prepared by bulk polymerization. Other particularly suitable ethylenically unsaturated monomers for the backbone polymer apart from the abovementioned polar, hydrophilic monomers are those which facilitate the grafting reaction, such as monomers having two double bonds of differing reactivity, e.g. the diethylenically unsaturated carboxylic esters, allyl acrylate or dicyclopentadienyl acrylate, as well as other difunctional compounds, such as butanediol diacrylate, diallyl phthalate or divinyl benzene.

Graft polymerization can be carried out in the absence of added polymerization initiators or in the presence of the conventional radical initiators soluble in the monomer mixture. Examples of suitable initiators are dibenzoyl peroxide, dilauroyl peroxide, di-tert-butyl peroxide, dicumyl peroxide or azodiisobutyronitrile. In the preparation of the copolymer, it may be advantageous in some cases to use mixtures of initiators which decompose at different temperatures.

The desired molecular weights of the graft polymer can be obtained by the amount of initiator and by the addition of conventional regulators, e.g. mercaptans, alcohols or halogen compounds. Graft copolymers having K values of from 30 to 70 are particularly suitable for use in accordance with the present invention.

Graft polymerization proceeds preferably at temperatures of from 60° to 200° C. and may be carried out batchwise or continuously. A gradual addition of the monomer mixture to the molten copolymer has proved quite satisfactory. Isothermal polymerization is preferred.

Hot-melt adhesives can be advantageously used for bonding materials commonly used in industry, for example plastics, leather, paper, metals, glass or wood. In the bonding operation graft copolymers are applied in the molten state as a thin layer to the material to be bonded in a manner conventionally employed for hot-melt adhesives, the two coated materials then being bonded together. For this purpose the graft copolymers can be employed either alone or in admixture with other styrene-acrylic ester or styrene-methacrylic ester copolymers as a hot-melt adhesive. It is also possible to mix them with conventional fillers and pigments, such as chalk, carbon black, barytes, kaolin, zinc oxide or calcium oxide, with resins, such as balsams, colophony esters, ketonic resins, phenolic resins or terpene resins, and/or with waxes, such as montan wax, and to employ melts of such mixtures for bonding. The addition of vinyl ether polymers of chlorinated diphenyl has an advantageous effect on the surface tack and hardness of the adhesive. The amount of added substance may be up to 80% by weight with reference to the total weight of the hot-melt adhesive.

The hot-melt adhesives according to this invention can be applied by conventional equipment, e.g. from a heated nozzle or from heated rollers. It is also possible to apply a coating of the hot-melt adhesive in a first step and then to allow the melt to set, the actual bonding operation being carried out later by thermally activating the coating of adhesive thus obtained, e.g. in a high-frequency field, and by hot pressing.

As compared with prior art hot-melt adhesives the graft copolymers are characterized by their surprisingly high thermal stability, so that they can be maintained in a molten state during the whole of a working day without undergoing any apparent change. They are practically unaffected by local overheating. They can be employed in high-frequency bonding. Furthermore, they have a favorable viscosity-temperature relationship, so that the liquid melts can be easily processed. In addition, they mix well with fairly large amounts of fillers, resins, waxes or paraffin waxes without the components separating either in the melt or on setting. The hot-melt adhesives according to this invention can be readily modified in their properties, such as flexibility, hardness or adhesion, so as to adapt them to particular applications, by varying the proportion and the kind of ester components in the backbone or grafted-on polymer.

As compared with conventional copolymers derived from styrene and acrylic ester or methacrylic ester and having about the same K values but not produced by graft polymerization, the hot-melt adhesives according to this invention have the advantage that they have a low softening point and a lower melt viscosity at the same temperature, which is an advantage in processing. Moreover, the resulting bonds exhibit superior tear strength and the joints are distinctly stronger than those obtained with prior art hot-melt adhesives.

The parts and percentages given in the examples are by weight. The K values were determined according to H. Fikentscher, Cellulosechemie, 13 (1932) 58, using a 1% solution in toluene. The softening point was determined according to Krämer, Sarnow and Nagel, Wissenschaftliche Veröffentlichung aus dem Siemens-Konzern, vol. 4 (1925) 321 to 323, and DIN 53,180. The melt viscosities were determined in an Epprecht-Viskotemp viscometer, the diameter of the rotor being 4 mm., stage 1. The tear tests were carried out at 20° C. on dumbbell specimens in accordance with ASTM-D 412–51 T which had been stamped out of 1 mm. thick sheets of the graft polymer. The shear strength of the bonds was determined in accordance with DIN 53,273 (comparable with ASTM-D 1002–64) at a rate of 150 mm./minute.

EXAMPLE 1

47.0 parts of a mixture derived from 14% of n-butyl acrylate and 86% of styrene was introduced together with 1.2 parts of azodiisobutyronitrile at 145° C. in the course of 1 hour into an autoclave provided with stirring and cooling means. Polymerization was complete after a total of 3 hours. The resulting polymer had a K value of 28.2.

53.0 parts of a mixture derived from 64% of n-butylacrylate and 36% of styrene was added together with 0.05 part azodiisobutyronitrile at the same temperature, with stirring, to the copolymer already in the autoclave in the course of 2 hours. After a further 2 hours, 0.05 part of di-tert-butyl peroxide, dissolved in a little styrene, was added to the contents in order to complete polymerization. Polymerization was finished after 1 to 2 hours. After distilling off minor quantities of volatile components in vacuo, a mother-of-pearl-colored, odorless melt was left in the autoclave and was removed in the usual manner. The resultant graft copolymer, which was highly viscous at room temperature, had a gross composition of 60% styrene and 40% n-butyl acrylate units, a gross K value of 40.6 and a softening point of 90° C.

A tear test at 20° C. gave the following values for the product:

Tensile strength—101 kg./cm.$^2$
Tear strength—64 kg./cm.$^2$
Tear energy—0.19 m. kg.
Elongation at break—320%.

On heating, a melt which could be easily processed was obtained with a viscosity of 78,000 cp. at 150° C. and 22,000 cp. at 180° C. A comparison was made between the temperature stability of the graft copolymer melt and that of other hot-melt adhesives; the results are shown in the table.

To test the adhesive properties, leather-to-leather and leather-to-rubber bonds were prepared. 0.02 to 0.04 mm. coatings of graft copolymer melt were applied to strips of material 2 cm. in width which were stuck together in such a way that a bonding area of 4 cm.$^2$ was obtained. The tests gave a shear strength of 20 kg./cm.$^2$ for leather-to-leather bonds and 15 kg./cm.$^2$ for leather-to-rubber bonds.

Comparative Experiment 1

A mixture derived from 60% of n-butyl acrylate and 40% of styrene was polymerized at 150° C. in the presence of 0.07% of azodiisobutyronitrile in an autoclave provided with stirring and cooling means. The product which was prepared in the usual manner, i.e. without grafting onto a copolymer, had a K value of 40 and a softening point of 93° C. A tear test at 20° C. gave the following results:

Tear strength—188 kg./cm.$^2$
Tear energy—0.09 m. kg.
Elongation at break—182%.

The melt had a viscosity of 90,000 cp. at 150° C., and 23,000 cp. at 180° C.

Leather-to-leather and leather-to-rubber bonds were prepared and tested in the manner described in Example 1. The leather-to-leather bonds had a shear strength of 16 kg./cm.$^2$, whereas the leather-to-rubber bonds had a strength of 14 kg./cm.$^2$.

EXAMPLE 2

Equal parts of a graft copolymer prepared according to Example 1 and of a copolymer prepared in a conventional manner from 58% of n-butyl acrylate and 42% of styrene, which had a K value of 43.9 and a melt viscosity of 16,000 cp. at 180° C., were melted together. The melt of the mixture had a viscosity of 16,000 cp. at 180° C.

Wood-to-wood and leather-to-leather bonds were prepared with the mixture melt and tested as described in Example 1. The wood-to-wood bonds had a shear strength of 19.5 kg./cm.$^2$ and the leather-to-leather bonds had a shear strength of 24 kg./cm.$^2$.

Comparative Experiment 2

The copolymer derived from 60% of n-butyl acrylate and 40% of styrene in accordance with Comparative Experiment 1 was melted together with an equal quantity of a copolymer prepared in a conventional manner from 42% of n-butyl acrylate and 58% of styrene that had a K value of 43.9 and a melt viscosity of 16,000 cp. at 180° C. The melt of the mixture had a viscosity of 16,250 cp. at 180° C.

As described in Example 1, wood-to-wood and leather-to-leather bonds were prepared with the melt of the mixture and then tested. The wood-to-wood bonds had a shear strength of 18.4 kg./cm.$^2$ and that of the leather-to-leather bonds was 20 kg./cm.$^2$.

EXAMPLE 3

Equal amounts of the graft copolymer prepared according to Example 1, a copolymer prepared in a conventional manner from 58% of n-butyl acrylate and 42% of styrene that had a K value of 43.9 and a melt viscosity of 16,000 cp. at 180° C., and a conventional cyclohexanone resin were melted together. The melt of the mixture had a viscosity of 2,800 cp. at 180° C.

Wood-to-wood and leather-to-leather bonds were prepared with the mixture of the melt and tested as indicated in Example 1. The wood-to-wood bonds had a shear strength of 30.5 kg./cm.$^2$ and the leather-to-leather bonds a strength of 30.0 kg./cm.$^2$.

Comparative Experiment 3

Equal amounts of the copolymer prepared in a conventional manner according to Comparative Experiment 1, a copolymer, prepared in a conventional manner from 58% of n-butyl acrylate and 42% of styrene that had a K value of 43.9 and a melt viscosity of 16,000 cp. at 180° C. and a conventional cyclohexanone resin were melted together. The mixture of the melt had a viscosity of 3,900 cp. at 180° C.

Wood-to-wood and leather-to-leather bonds were prepared with the melt mixture and tested as described in Example 1. Both the wood-to-wood and leather-to-leather bonds had a shear strength of 25.0 kg./cm.$^2$.

EXAMPLE 4

In order to test the properties of mixtures of hot-melt adhesives according to this invention and other resins, 100 parts of a graft copolymer prepared according to Example 1 was melted together with 20 parts of a Russian balsam. The mixture thus prepared had a softening point of 90° C. and gave the following values in a tear test conducted at 20° C.:

Tensile strength—100 kg./cm.$^2$
Tear strength—67 kg./cm.$^2$
Tear energy—0.14 m. kg.
Elongation at break—350%.

The mixture of the melt had a viscosity of 29,300 cp. at 150° C. and 6,500 cp. at 180° C.

EXAMPLE 5

In order to test the properties of mixtures of the hot-melt adhesive according to this invention with other resins, 100 parts of a graft copolymer prepared according to example 1 was melted together with 10 parts of a conventional cyclohexanone resin. The mixture thus prepared had a softening point of 94° C. and gave the following values in a tear test conducted at 20° C.:

Tensile strength—124 kg./cm.$^2$
Tear strength—72 kg./cm.$^2$
Tear energy—0.155 m. kg.
Elongation at break—330%.

The melt of the mixture had a viscosity of 52,600 cp. at 150° C. and 15,600 cp. at 180° C.

When 100 parts of the graft copolymer of Example 1 was melted together with 20 parts of a conventional cyclohexanone resin, the resultant mixture had a softening point of 91° C. and the following values were obtained in a tear test conducted at 20° C.:

Tensile strength—140 kg./cm.$^2$
Tear strength—67 kg./cm.$^2$
Tear energy—0.095 m.kg.
Elongation at break—190%.

The melt of the mixture had a viscosity of 17,200 cp. at 150° C. and 4,000 cp. at 180° C.

EXAMPLE 6

200 parts of styrene was polymerized, in the absence of polymerization initiator, at 120° C. for 2 hours in a reactor provided with stirring and cooling means, about 50% of the styrene being converted to a polystrene with a K value of 55. Afterwards, a mixture of 400 parts of styrene and 400 parts of 2-ethylhexyl acrylate was added to the contents of the vessel in the course of 1¼ hours at 130° C., and the polymer composition was maintained at 130° C. for 2½ hours. The reaction mixture was brought up to 190° C. in the course of 1 hour and then kept at 150° C. for 12 hours. After distilling off about 27 parts of volatile components in vacuo, a graft copolymer which was soft and slightly cloudy at room temperature was left in the reactor; this graft copolymer had a K value of 47.7, a softening point of 88.5° C. and a gross composition of 60% of styrene and 40% of 2-ethylhexyl acrylate units. The graft copolymer prepared in this way gave the following results in a tear test conducted at 20° C.:

Tensile strength—26.7 kg./cm.$^2$
Tear strength—26.7 kg./cm.$^2$
Tear energy—0.17 m. kg.
Elongation at break—840%.

The graft copolymer melt had a viscosity of 68,000 cp. at 180° C.

Wood-to-wood and leather-to-leather bonds were prepared with the melt of the mixture and tested as specified in Example 1. The wood-to-wood bonds had a shear strength of 38 kg./cm.$^2$ and the leather-to-leather bonds had a shear strength of 15 kg./cm.$^2$.

Comparative Experiment 4

A mixture of 600 parts of styrene and 400 parts of 2-ethylhexyl acrylate was allowed to run into a reactor provided with stirring and cooling means at a reactor temperature of 120° C. in the course of 1¼ hours and polymerized for 4 hours at this temperature. After distilling off about 15 parts of volatile components from the reaction mixture, a clear copolymer was obtained upon cooling which had a K value of 53, a softening point of 98° C. and a gross composition of 60% of styrene and 40% of 2-ethylhexyl acrylate units. In the tear test at 20° C., the product gave the following values:

Tensile strength—27.6 kg./cm.$^2$
Tear strength—27.6 kg./cm.$^2$
Tear energy—0.16 m. kg.
Elongation at break—770%.

The copolymer melt had a viscosity of 200,000 cp. at 180° C.

Wood-to-wood and leather-to-leather bonds were prepared with the copolymer melt and tested as described in Example 1. The wood-to-wood bonds had a shear strength of 35 kg./cm.$^2$ and the leather-to-leather bonds had a shear strength of 10 kg./cm.$^2$.

EXAMPLE 7

200 parts of a graft copolymer prepared according to Example 6 was melted together with 100 parts of a Russian balsam. The melt of the mixture had a viscosity of 11,200 cp. at 180° C.

Wood-to-wood and leather-to-leather bonds were prepared and tested as described in Example 1. The wood-to-wood bonds had a shear strength of 52 kg./cm.$^2$ and the leather-to-leather bonds a shear strength of 20 kg./cm.$^2$.

Comparative Experiment 5

200 parts of the copolymer prepared in a conventional manner as described in Comparative Experiment 4 was melted togeher with 100 parts of a Russian balsam. The melt of the mixture had a viscosity of 14,000 cp. at 180° C.

The wood-to-wood and leather-to-leather bonds prepared and tested as indicated in Example 1 had shear strengths of 49 kg./cm.$^2$ and 16 kg./cm.$^2$ respectively.

EXAMPLE 8

750 parts of styrene was heated for 1½ hours at 120° C., in the absence of polymerization initiators, in a reactor provided with stirring and cooling means. 38% of the styrene used was converted to a polystyrene with a K value of 51. Afterwards, a mixture of 750 parts of styrene and 1,500 parts of n-butyl acrylate was added in the course of 2½ hours to the contents kept at 120° C. After a further 3 hours, 0.5 part of di-tert-butyl peroxide dissolved in a small amount of styrene was added to the reaction mixture to complete polymerization, polymerization being complete in 1 hour during which period the temperature rose to 200° C. After distilling off in vacuo about 12 parts of volatile components, a graft copolymer that was soft at room temperature and had a gross K value of 54 was obtained. The product gave the following values in a tear test carried out at 20° C.:

Tear strength—35.0 kg./cm.$^2$
Tear energy—0.36 m. kg.
Elongation at break—820%.

The graft copolymer melt had a viscosity of 150,000 cp. at 180° C.

Wood-to-wood and leather-to-leather bonds were prepared with the melt of this mixture and then tested as described in Example 1. The wood-to-wood bonds had a shear strength of 30 kg./cm.$^2$ and the leather-to-leather bonds a shear strength of 11 kg./cm.$^2$.

Comparative Experiment 6

A mixture of 1,500 parts of styrene and 1,500 of n-butyl acrylate was heated, in the absence of initiators, for 4 hours at a temperature of 140° C. in a reactor equipped with stirring and cooling means. Polymerization was then brought to completion in 3 hours at 160° to 200° C. with the addition of 0.5 part of di-tert-butyl peroxide. After distilling off approximately 8 parts of volatile components, a copolymer was obtained which was soft and clear at room temperature and which had a K value of 52. The copolymer gave the following values in a tear test conducted at 20° C.:

Tear strength—23.4 kg./cm.$^2$
Tear energy—0.18 m. kg.
Elongation at break—750%.

The copolymer melt had a viscosity of 170,000 cp. at 180° C.

Wood-to-wood and leather-to-leather bonds were prepared with the melt of the mixture and tested in the manner described in Example 1. The wood-to-wood bonds had a shear strength of 26 kg./cm.$^2$ and the leather-to-leather bonds a shear strength of 12 kg./cm.$^2$.

EXAMPLE 9

200 parts of the graft copolymer according to Example 8 was melted together with 100 parts of a Russian balsam. The melt of the mixture had a viscosity of 12,200 cp. at 180° C.

The wood-to-wood and leather-to-leather bonds prepared with the melt of the mixture and tested as described in Example 1 exhibited shear strengths of 40 kg./cm.$^2$ and 13 kg./cm.$^2$ respectively.

Comparative Experiment 7

200 parts of the copolymer according to Comparative Experiment 6 which had been prepared in a conventional manner was melted together with 100 parts of a Russian balsam. The melt of the mixture had a viscosity of 16,100 cp. at 180° C.

The wood-to-wood and leather-to-leather bonds prepared with the melt and tested as described in Example 1 exhibited shear strengths of 35 kg./cm.$^2$ and 9 kg./cm.$^2$ respectively.

EXAMPLE 10

A mixture of 80 parts of a copolymer derived from 47.5 parts of styrene and 52.5 parts of methyl methacrylate (K value 55.4) was dissolved in 200 parts of a mixture consisting of 400 parts of n-butyl acrylate, 520 parts of styrene and 0.5 part of azodiisobutyronitrile and heated to 135° C. in a reactor equipped with stirring and cooling means. The remaining 720.5 parts of the monomer initiator mixture was then added in the course of 45 minutes. The temperature rose slowly to 150° C.

during this period. Polymerization was continued at 150° C. for a further 4 hours, then the temperature was raised to 235° C. in the course of 1 hour to complete polymerization. A heterogeneous graft copolymer with a K value of 45.2 was obtained. The softening point of the copolymer was +97° C. The tear strength of a film of this copolymer was 117 kg./cm.$^2$ and the elongation at break 40%. The melt viscosity was 400,000 cp. at 150° C. and 97,000 cp. at 180°.

EXAMPLE 11

3.5 parts of a mixture of 98.6% of styrene and 0.4% of butanediol monoacrylate was polymerized in the presence of 1% of azodiisobutyronitrile at 135° C. in the course of 90 minutes in a reactor provided with stirring and cooling means, the mixture of monomers and initiator being introduced gradually into the reactor.

Subsequently, 96.5 parts of a mixture of 30% of methyl methacrylate, 44.7% n-butyl acrylate, 5% of butanediol monoacrylate and 9.8% of styrene was added in the presence of 0.5% azodiisobutyronitrile in the course of 40 minutes at the same temperature to the above-described molten backbone polymer and polymerization is carried out for 95 minutes. The temperature was raised to 160° C. in the course of 60 minutes, and the remaining unreacted monomer was distilled off in vacuo. The resultant graft copolymer, which was viscous at room temperature and cloudy-white in color, had a gross composition of 12.7% of styrene, 4.9% of butanediol monoacrylate, 38.8% of methyl methacrylate and 43.6% of n-butyl acrylate, the K value being 33.5 and the softening point +86° C.

The product gave the following values in a tear test conducted at 20° C.:

Tear strength—38 kg./cm.$^2$
Tear energy—0.195 m. kg.
Elongation at break—520%.

Its melt viscosity was as follows:

116,000 cp. at 150° C.
24,000 cp. at 180° C.
12,000 cp. at 210° C.

The leather-to-leather bonds had a shear strength of 12 kg./cm.$^2$ and the wood-to-wood bonds a shear strength of 36 kg./cm.$^2$.

EXAMPLE 12

2 parts of the graft polymer according to Example 11 was mixed in the molten state with 1 part of colophony. The mixture thus obtained had a viscosity of 3,800 cp. at 180° C. Leather-to-leather bonds prepared with this mixture had a tear strength of 15 kg./cm.$^2$ and wood-to-wood bonds had a tear strength of 45 kg./cm.$^2$.

EXAMPLE 13

30 parts of a mixture of 49.9% of styrene and 49.9% of n-butyl acrylate was polymerized in the presence of 0.2% of azodiisobutyronitrile for 45 minutes at 140° C. in a reactor provided with stirring and cooling means, the mixture of the monomers and initiator being introduced gradually into the reactor. Polymerization was complete after 70 minutes and the melt was cooled to 120° C. in the course of 50 minutes.

A mixture of 30% of styrene, 30% of butyl acrylate, 30% of dodecyl acrylate and 9.7% of butanediol monoacrylate together with 0.3% of azodiisobutyronitrile was allowed to run into the melt of the resultant backbone polymer having a temperture of 120° C. in the course of 1½ hours and the whole was polymerized. After adding the mixture, the temperature was gradually raised from 120° to 160° C. in the course of 2 hours and the residual monomer was distilled off in the course of a further 45 minutes. The graft copolymer obtained had a gross composition of 36% of n-butyl acrylate, 36% of styrene, 21% of dodecyl acrylate and 7% of butanediol monoacrylate, and a K value of 50.4, the softening point being +83° C. It was soft, tacky, and cloudy-white in color.

In the tear test no rupture occurred until the elongation reached 4,000%. This corresponds to a tear energy of over 0.20 m. kg. The viscosity of the melt was as follows:

267,000 cp. at 150° C.
83,500 cp. at 180° C.
43,800 cp. at 210° C.

EXAMPLE 14

50 parts of a mixture of 64.6% of styrene, 2% of acrylic acid, 33.0% of n-butyl acrylate and 0.4% of azodiisobutyronitrile was introduced into a reactor provided with stirring and cooling means in the course of 1 hour and polymerized at 140° C. Polymerization was complete after a further hour at the same temperature.

50 parts of a mixture of 89.9% of n-butyl acrylate, 10% of styrene and 0.1% of azodiisobutyronitrile was added at 130° C. in the course of 50 minutes to the melt of the resultant backbone polymer which was still hot and polymerization was completed in 1½ hours. The temperature was then increased in the course of 1 hour to 160° C., at which temperature the unreacted monomers were evaporated off.

The graft copolymer obtained had a gross composition of 61.5% of n-butyl acrylate, 37.5% of styrene and 1% of acrylic acid, and a K value of 44.7, the softening point being +95° C. A tear test gave the following results:

Tear strength—23 kg./cm.$^2$
Tear energy—0.06 m. kg.
Elongation at break—200%.

Its melt viscosity was as follows:

211,000 cp. at 150° C.
67,500 cp. at 180° C.
32,000 cp. at 210° C.

Leather-to-leather and wood-to-wood bonds had shear strengths of 12 kg./cm.$^2$ and 32 kg./cm.$^2$ respectively.

2 parts of the graft copolymer was mixed in the melt with 1 part of colophony. The viscosity of the mixture was 8,500 cp. Leather-to-leather and wood-to-wood bonds prepared with this mixture had shear strengths of 16 kg./cm.$^2$ and 39 kg./cm.$^2$ respectively.

TABLE I

[Comparison of the thermal stability of various hot-melt adhesives]

| Hot-melt adhesive | Temperature, °C. | |
|---|---|---|
| Polyvinyl acetate | 150 | Yellowing sets in after 3 hours, which becomes gradually more intense. |
| | 200 | Yellowing after 2 hours. |
| Copolymer of 88% of ethylene and 12% of vinyl acetate (melt index 4). | 150 | Unchanged after 8 hours. |
| | 200 | Skin formation on the surface after 2 hours. |
| Copolyamide derived from caprolactam, AH salt and heptadecane dicarboxylic acid (K value 45). | 150 | Skin formation with browning sets in after 1 hour. |
| | 200 | Skin formation with browning after 1 hour |
| Styrene-acrylic ester copolymers according to Examples 1, 4 and 6. | 150 | Unchanged after 8 hours. |
| | 200 | Do. |
| Styrene-acrylic ester graft copolymers according to Examples 1, 6 and 8. | 150 | Do. |
| | 200 | Do. |

We claim:

1. A hot-melt adhesive comprising a graft copolymer which has a K value of from 30 to 70, measured as a 1% solution in toluene, and which has a total monomeric content of:
   (A) 20 to 80% by weight of styrene;
   (B) 20 to 80% by weight of a monomer selected from the class consisting of acrylic and methacrylic esters of primary and secondary alkanols containing 3 to 12 carbon atoms; and
   (C) 0 to 10% by weight of other ethylenically unsaturated monomers;
said graft copolymer being prepared by the bulk polymerization of:
   (I) 50 to 98% by weight of a monomeric mixture of 10 to 70% by weight of styrene (A), 30 to 90% by weight of the monomeric component (B) and 0 to 10% by weight of the monomeric component (C) onto
   (II) 2 to 50% by weight of a backbone polymer of 50 to 100% by weight of styrene (A), 0 to 50% by weight of the monomeric component (B) and 0 to 10% by weight of the monomeric component (C).

2. A hot melt-adhesive as claimed in claim 1 wherein said monomeric component (C) is at least one compound selected from the class consisting of: ethylenically unsaturated mono- and di-carboxylic acids, their amides, their N-methylolamides and the alkyl ethers of their N-methylolamides containing 1 to 4 carbon atoms in the alkyl radical; vinyl sulfonic acid, maleic anhydride; itaconic anhydride; acrylic and methacrylic monoesters of alkanediols containing 2 to 6 carbon atoms; diethylenically unsaturated carboxylic acid esters; and divinyl benzene.

3. A hot-melt adhesive as claimed in claim 1 wherein 50 to 75% of the monomeric mixture (I) is bulk polymerized onto 25 to 50% by weight of the backbone polymer (II).

4. A hot-melt adhesive comprising a graft copolymer which has a K value of from 30 to 70, measured as a 1% solution in toluene, and which has a total monomeric content of:
   (A) 30 to 60% by weight of styrene;
   (B) 40 to 70% by weight of a monomer selected from the class consisting of acrylic and methacrylic esters of primary and secondary alkanols containing 3 to 12 carbon atoms; and
   (C) 0.1 to 5% by weight of at least one other ethylenically unsaturated monomer;
said graft copolymer being prepared by the bulk polymerization of:
   (I) 50 to 75% by weight of a monomeric mixture of 30 to 60% by weight of styrene (A), 40 to 70% by weight of the monomeric component (B) and 0.1 to 5% by weight of the monomeric component (C) onto
   (II) 2 to 50% by weight of a backbone polymer of 75 to 100% by weight of styrene (A), 0 to 25% by weight of the monomeric component (B) and 0.1 to 5% by weight of the monomeric component (C).

5. A hot-melt adhesive as claimed in claim 4 wherein 50 to 75% of the monomeric mixture (I) is bulk polymerized onto 25 to 50% by weight of the backbone polymer (II).

6. A hot-melt adhesive as claimed in claim 1 wherein the monomeric component (B) is n-butyl acrylate.

7. A hot-melt adhesive as claimed in claim 4 wherein the monomeric component (B) is n-butyl acrylate.

8. A hot-melt adhesive as claimed in claim 1 wherein the monomeric component (B) is 2-ethylhexyl acrylate.

9. A hot-melt adhesive as claimed in claim 4 wherein said graft copolymer consists essentially of (A) styrene, (B) n-butyl acrylate and (C) acrylic acid.

References Cited

UNITED STATES PATENTS

| 2,962,465 | 11/1960 | Lindstrom et al. | 260—885 |
| 3,244,655 | 4/1966 | Sullivan et al. | 260—885 |

OTHER REFERENCES

Burlant et al., "Block and Graft Polymers," Reinhold Pub. Corp., New York, 1960, pp. 15–19 and 53–55.

SAMUEL H. BLECH, Primary Examiner

U.S. Cl. X.R.

156—327; 161—204, 218, 226, 251, 256; 260—27, 28.5, 41, 86.1, 876